United States Patent [19]
Shimizu et al.

[11] Patent Number: 5,924,519
[45] Date of Patent: Jul. 20, 1999

[54] ELECTRIC POWER STEERING DEVICE AND METHOD OF ASSEMBLING THE SAME

[75] Inventors: Yasuo Shimizu; Katsuji Watanabe, both of Wako, Japan

[73] Assignee: Honda Giken Kogyo Kabushiki Kaisha, Tokyo, Japan

[21] Appl. No.: 08/861,305

[22] Filed: May 21, 1997

[30] Foreign Application Priority Data

May 21, 1996 [JP] Japan .................................. 8-126139

[51] Int. Cl.⁶ ...................................................... B62D 5/04
[52] U.S. Cl. ............................................................ 180/444
[58] Field of Search .................................. 180/443, 444, 180/445, 446

[56] References Cited

U.S. PATENT DOCUMENTS

| | | | |
|---|---|---|---|
| 4,967,858 | 11/1990 | Kotake et al. | 180/443 |
| 5,029,659 | 7/1991 | Saito | 180/443 |
| 5,445,237 | 8/1995 | Eda et al. | 180/444 |
| 5,732,790 | 3/1998 | Endo et al. | 180/444 |
| 5,836,419 | 11/1998 | Shimizu et al. | 180/443 |

FOREIGN PATENT DOCUMENTS

1-172058  7/1989  Japan .

*Primary Examiner*—Kevin Hurley
*Attorney, Agent, or Firm*—Merchant, Gould, Smith, Edell, Welter & Schmidt, P.A.

[57] ABSTRACT

An electric power steering device includes a steering torque detector for detecting a steering torque in a steering system by detecting relative rotation between an input shaft and an output shaft, an electric motor for generating an auxiliary torque corresponding to a detection signal from the steering torque detector, and a torque transmitting mechanism for transmitting the auxiliary torque from the electric motor to the output shaft. The steering torque detector is composed of a detector body directly attached to the input shaft, and an actuator engaged with the output shaft for activating the detector body. With the steering torque detector thus arranged, an adjustment of the neutral position of the steering torque detector can be performed after the input and output shafts, the steering torque detector, and the torque transmitting mechanism are assembled together to form a single semi-finished steering assembly, and before the semi-finished steering assembly is received in a housing. Since this adjustment is effected on the steering torque detector while the semi-finished steering assembly is standing alone before it is assembled in the housing, the neutral position of the steering torque detector can be obtained with excellent accuracy but through a simple adjustment work.

4 Claims, 10 Drawing Sheets

ELECTRIC POWER STEERING DEVICE AND METHOD OF ASSEMBLING THE SAME

BACKGROUND OF THE INVENTION

1. Field of the Invention

The present invention relates to improvements in an electric power steering device and a method of assembling the electric power steering device.

2. Description of the Related Art

In recent years, electric power steering devices have been used extensively as they can reduce the driver's muscular effort or force required to turn the steering handle and thus provide a comfortable steering touch to the driver. The electric power steering devices of the type concerned are constructed such that an auxiliary torque generated by an electric motor in proportion to the steering torque is transmitted via a mechanical clutch to the steering system. One example of such electric power steering devices is disclosed in Japanese Patent Laid-open Publication No. HEI 1-172058, entitled "Electric Power Steering Device".

The disclosed electric power steering device includes a steering torque detecting means for detecting a steering torque in a steering system, and an electric motor for generating an auxiliary torque according to a detection signal from the steering torque detecting means. The electric motor is connected to a sleeve, and the sleeve is connected by a clutch mechanism to a hexagonal portion of an output shaft. The output shaft is connected to steered wheels. Thus, the auxiliary torque from the electric motor is transmitted to the output shaft. The sleeve forms part of the clutch mechanism and is rotatably supported on an upper housing. The output shaft is rotatably supported on the upper housing and a lower housing. The output shaft also has a portion supported on the upper housing via the sleeve. The conventional electric power steering device having such support or bearing structure has a limited assembling accuracy.

The steering torque detecting means, in one form, includes a ring fitted around an input shaft, and a strain gauge attached to a cantilevered resilient metal strip. The resilient metal strip has a free end held in engagement with the ring. The ring is movable or displaceable in the axial direction of the input shaft in response to a relative torsional displacement or rotation between the input shaft and the output shaft. With this displacement of the ring, the resilient metal strip is resiliently deformed or flexed whereupon the strain gauge produces an electric signal corresponding to the relative torsional displacement between the input shaft and the output shaft.

In an alternative form, the steering torque detecting means includes two confronting annular flanges formed on the input shaft and the output shaft, respectively, and a brush slidably disposed between the annular flanges so as to form, jointly with the annular flanges, a slip ring. The thus formed slip ring generates an electric signal directly corresponding to a relative torsional displacement between the input shaft and the output shaft.

In the first-mentioned form of the steering torque detecting means, the resilient metal strip carrying thereon the strain gauge is cantilevered within a case. Since the case is attached to the upper housing, mounting of the steering torque detecting means should be achieved in the course of an assembling process which is performed to assemble a body of the electric power steering device in a housing composed of the upper housing and the lower housing. Such a mounting procedure is quite laborious and makes it difficult to replace the steering torque detecting means. In addition, since an adjustment of the neutral position of the steering torque detecting means is performed under the condition that the steering torque detecting means is held in the housing, it is very difficult to carry out the neutral position adjustment work with sufficient efficiency and accuracy.

The second-mentioned form of the steering torque detecting means also has a drawback that since two confronting annular flanges forming the slip ring are formed on the input shaft and the output shaft, respectively, replacement of the steering torque detecting means is practically impossible. The input shaft further has a large-diameter tubular portion forming one part of the clutch mechanism, and the output shaft further has a hexagonal portion forming another part of the clutch mechanism. With this arrangement, an adjustment of the neutral position of the steering torque detecting means and an adjustment of the neutral position of the clutch mechanism cannot be achieved separately. The neutral position adjustments are, therefore, rendered tedious and time-consuming and insufficient in accuracy.

SUMMARY OF THE INVENTION

It is accordingly an object of the present invention to provide an electric power steering device which is capable of being assembled easily, efficiently and accurately.

Another object of the present invention is to provide an electric power steering device including a steering torque detecting means or unit which can be easily assembled with a body of the electric power steering device and is able to secure an easy and accurate neutral position adjustment.

A further object of the present invention is to provide an electric power steering device including a clutch mechanism which is easy to assemble and able to secure an easy and accurate neutral position adjustment.

A still further object of the present invention is to provide a method of assembling an electric power steering device, which makes it possible to perform an adjustment of the neutral position of a clutch mechanism and an adjustment of the neutral position of a steering torque detecting means or unit with utmost ease and improved accuracy.

Yet another object of the present invention is to provide a method which is capable of assembling an electric power steering device with improved efficiency.

The present invention, in one aspect, seeks to provide an electric power steering device comprising: an input shaft connected to a steering wheel; an output shaft connected to steered wheels; a resilient member connecting together the input shaft and the output shaft while allowing the input and output shafts to rotate relatively to each other; a steering torque detecting means for detecting a steering torque in a steering system by detecting relative rotation between the input shaft and the output shaft; an electric motor for generating an auxiliary torque corresponding to a detection signal from the steering torque detecting means; a torque transmitting means for transmitting the auxiliary torque from the electric motor to the output shaft; and a housing containing therein at least part of the input shaft, at least part of the output shaft, at least part of the resilient member, and the torque transmitting means. The steering torque detecting means is composed of a detector body directly attached to one of the input shaft and the output shaft, and an actuator engaged with the other of the input shaft and the output shaft for activating the detector body. The detector body and the actuator are received in the housing together with the input shaft and the output shaft.

Since the steering torque detecting means composed of the detector body and the actuator is attached to the input and output shafts, an adjustment of the neutral position of the steering torque detecting means can be performed after the input shaft, the output shaft, the steering torque detecting means, and the torque transmitting means are assembled together to form a single semi-finished steering assembly, and before the semi-finished steering assembly is received in the housing. More particularly, since the neutral position adjustment is effected in such a condition that the steering torque detecting means is already assembled with the semi-finished steering assembly but the semi-finished steering assembly is still standing alone before it is assembled into the housing, the neutral position of the steering torque detecting means can be obtained with excellent accuracy but through a simple adjustment work or operation.

In addition, since the detector body and the actuator of the steering torque detecting means are received at one time in the housing automatically when the semi-finished steering assembly is set or installed in the housing, the efficiency of the assembling operation is extremely high. The steering torque detecting means of the foregoing construction is easy to replace.

The present invention, in another aspect, seeks to provide an electric power steering device of the type wherein an auxiliary torque generated by an electric motor is transmitted via a torque transmitting means and a clutch mechanism to a pinion shaft of a rack-and-pinion mechanism in a steering system, characterized in that: the clutch mechanism is disposed between the torque transmitting means and the pinion shaft and received in a housing together with the torque transmitting means and the pinion shaft; the pinion shaft is rotatably mounted only on the housing; and the torque transmitting means includes a wheel for connecting together the torque transmitting means and the clutch mechanism, the wheel being rotatably mounted only on the pinion shaft.

Since the clutch mechanism is disposed between the torque transmitting means and the pinion shaft, it is possible to perform an adjustment of the neutral position of the clutch mechanism after the pinion shaft, the torque transmitting means, and the clutch mechanism are assembled together to form a semi-finished steering assembly and before the semi-finished steering assembly is set or installed in the housing. More particularly, since the neutral position adjustment is effected in such a condition that the clutch mechanism is already assembled with the semi-finished steering assembly but the semi-finished steering assembly is still standing alone before it is assembled in the housing, the neutral position of the clutch mechanism can be obtained with high accuracy but through a simple adjustment work.

In addition, since the clutch mechanism is automatically received when the semi-finished steering assembly is set in the housing, assembling efficiency of the electric power steering device increases greatly. Furthermore, since the pinion shaft is rotatably mounted only on the housing, and since the wheel of the torque transmitting means is rotatably mounted only on the pinion shaft, it is possible to fit the pinion shaft directly with the housing. By virtue of this supporting structure, the assembling accuracy of the electric power steering device is greatly improved.

The present invention, in still another aspect, seeks to provide an electric power steering device comprising: an input shaft connected to a steering wheel; an output shaft connected to steered wheels; a resilient member connecting together the input shaft and the output shaft while allowing the input and output shafts to rotate relatively to each other; a steering torque detecting means for detecting a steering torque in a steering system by detecting relative rotation between the input shaft and the output shaft; an electric motor for generating an auxiliary torque corresponding to a detection signal from the steering torque detecting means; a torque transmitting means for transmitting the auxiliary torque from the electric motor to the output shaft via a clutch mechanism; and a housing containing therein at least part of the input shaft, at least part of the output shaft, at least part of the resilient member, and the torque transmitting means. The steering torque detecting means is composed of a detector body directly attached to one of the input shaft and the output shaft, and an actuator engaged with the other of the input shaft and the output shaft for activating the detector body. The clutch mechanism is disposed between the torque transmitting means and the output shaft. The torque transmitting means includes a wheel for connecting together the torque transmitting means and the clutch mechanism, the wheel being rotatably supported solely on the output shaft. And, the steering torque detecting means and the clutch mechanism are received in the housing together with the input shaft and the output shaft.

Since the steering torque detecting means which is composed of the detector body and the actuator is attached to the input and output shafts, and since the clutch mechanism is disposed between the torque transmitting means and the output shaft, an adjustment of the neutral position of the clutch mechanism and an adjustment of the neutral position of the steering torque detecting means can be performed after the input shaft, the output shaft, the steering torque detecting means, the torque transmitting means, and the clutch mechanism are assembled together to form a single semi-finished steering assembly, and before the semi-finished steering assembly is received in the housing. More particularly, since the neutral position adjustments are effected in such a condition that the clutch mechanism and the steering torque detecting means are already assembled with the semi-finished steering assembly but the semi-finished steering assembly is still standing alone before it is assembled into the housing, the respective neutral positions of the clutch mechanism and the steering torque detecting means can be obtained with excellent accuracy but through a simple adjustment work.

In addition, since the clutch mechanism and the steering torque detecting means are received at one time in the housing automatically when the semi-finished steering assembly is set or installed in the housing, the electric power steering device can be assembled with improved efficiency. Furthermore, replacement of the steering torque detecting means is easy to perform. Since the output shaft is rotatably mounted only on the housing, and since the wheel of the torque transmitting means is rotatably mounted only on the output shaft, the output shaft can be directly fitted with the housing. By virtue of this supporting structure, the assembling accuracy of the electric power steering device is greatly improved.

Preferably, the actuator comprises a lever-like configuration. The lever-like actuator is pivotally connected at one end to the detector body attached to the one shaft and, at the opposite end, slidably engaged in a diagonal groove formed in an outer peripheral surface of the other shaft.

It is further preferable that the wheel is a hollow cylindrical member rotatably fitted around the output shaft, the hollow cylindrical member being formed from a self-lubricating material.

The present invention, in yet another aspect, seeks to provide a method of assembling an electric power steering device, comprising the steps of: assembling together an input shaft adapted to be connected to a steering wheel, an output shaft adapted to be connected to steered wheels, a resilient member for connecting together the input shaft and the output shaft while allowing them to rotate relatively to each other, a steering torque detecting means for detecting relative rotation between the input shaft and the output shaft, a torque transmitting means for transmitting an auxiliary torque generated by an electric motor to the output shaft, and a clutch mechanism thereby to form a semi-finished steering assembly; then, inserting the semi-finished steering assembly into a housing through an opening at one end of the housing such that part of the input shaft, the output shaft, the steering torque detecting means, the torque transmitting means, and the clutch mechanism are all received at one time in the housing; and thereafter, attaching a lid to the one end of the housing to close the opening.

The method may further include, between the assembling step and the inserting step, a step of adjusting the neutral position of the clutch mechanism, and a step of adjusting the neutral position of the steering torque detecting means. The step of adjusting the neutral position of the steering torque detecting means and the step of adjusting the neutral position of the clutch mechanism are performed separately from each other. Since both adjustment processes are effected in such a condition that the clutch mechanism and the steering torque detecting means are already assembled with the semi-finished steering assembly but the semi-finished steering assembly is still standing alone before it is assembled in the housing, the neutral position can be obtained with excellent accuracy but through a simple adjustment work.

In addition, since the clutch mechanism and the steering torque detecting means are received in the housing automatically when the semi-finished steering assembly is set or installed in the housing, the electric power steering device can be assembled with improved efficiency.

The above and other object, features and advantages of the present invention will become manifest to those versed in the art upon making reference to the detailed description and accompanying sheets of drawings in which preferred structural embodiments incorporating the principles of the present invention are shown by way of illustrative example.

DETAILED DESCRIPTION OF THE PREFERRED EMBODIMENTS

Now, one preferred structural embodiment of the present invention will be described below in greater detail with reference to the accompanying sheets of drawings, wherein like reference characters designate like or corresponding parts throughout the several views.

Figure 1:
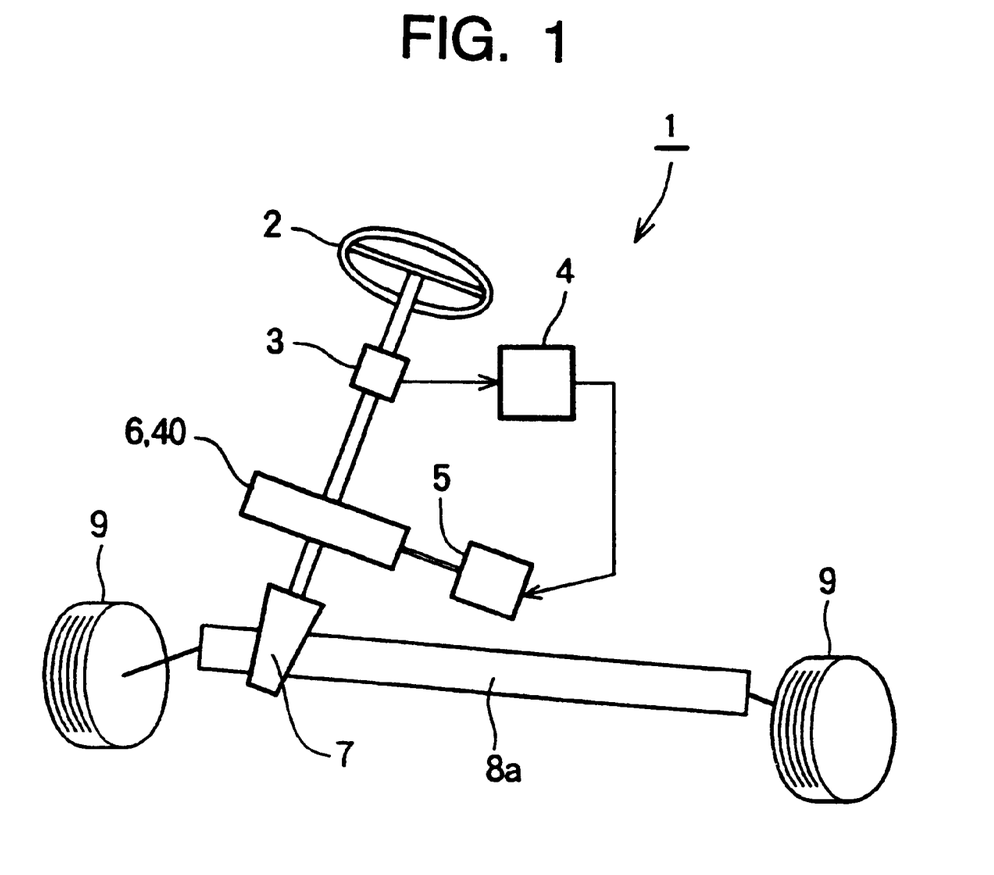
FIG. 1 is a diagrammatical view showing the general construction of an electric power steering device according to an embodiment of the present invention.

FIG. 1 diagrammatically shows the general construction of an electric power steering device 1 embodying the present invention. The electric power steering device 1 includes a steering torque detecting means or detector 3 for detecting a steering torque created in a steering system when a steering wheel 2 is actuated, a control unit or controller 4 for generating a control signal based on a detection signal from the steering torque detector 3, an electric motor 5 for producing, based on the control signal from the controller 4, an auxiliary torque proportional to the steering torque, and a torque transmitting means or mechanism 6 and a mechanical clutch 40 that cooperate with each other to transmit the auxiliary torque from the electric motor 4 to a steering system. The electric power steering device 1 thus constructed is operative to steer a pair of wheels (steered wheels) 9, 9 via a rack-and-pinion mechanism including a pinion 7 and a rack 8a.

Figure 2:
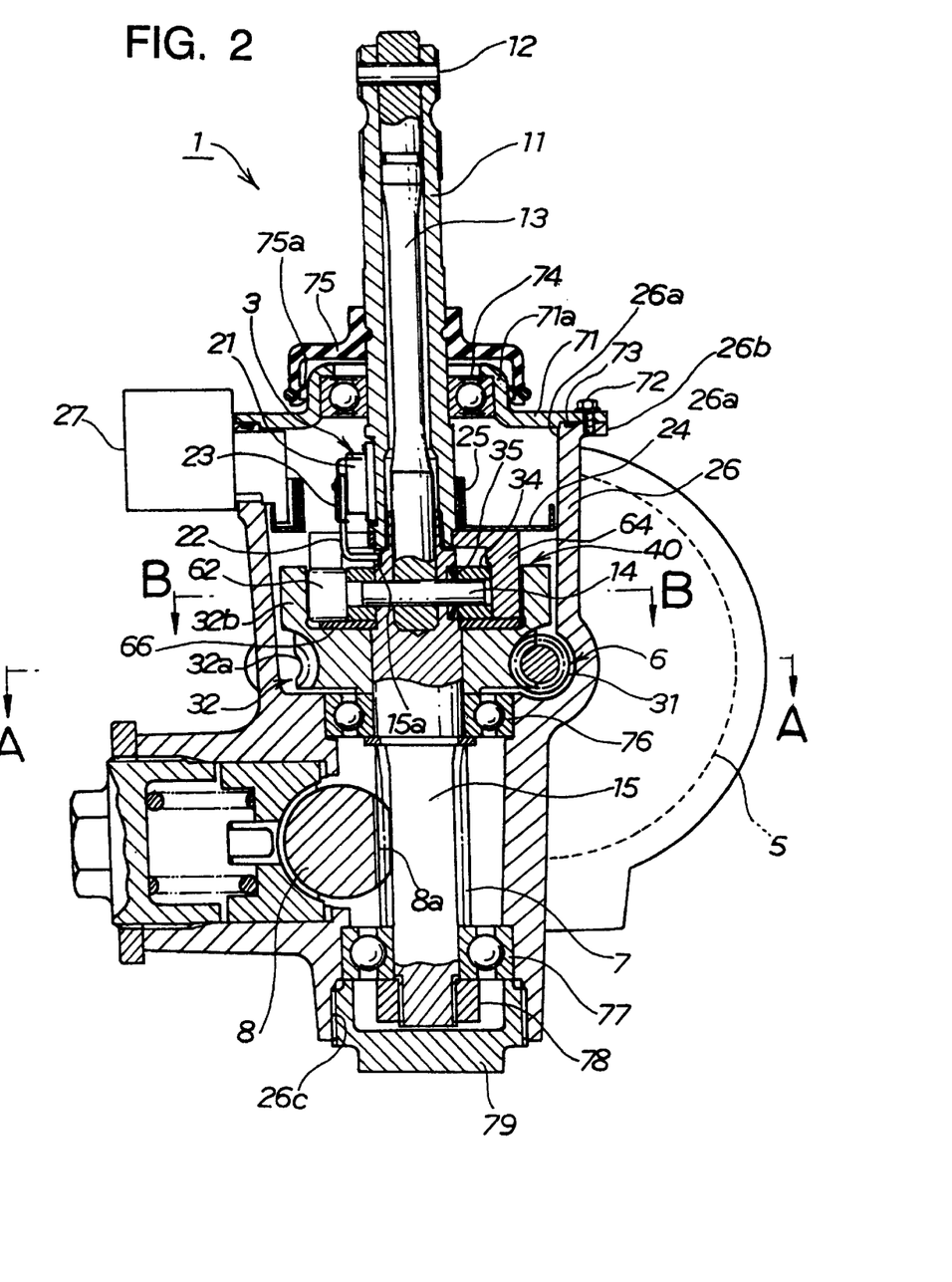
FIG. 2 is a cross-sectional view showing on enlarged scale an essential part of the electric power steering device.

FIG. 2 shows, in enlarged cross section, a main portion of the electric power steering device 1. As shown in the same figure, the steering system is composed of a tubular input shaft 11 connected to the steering wheel 2 (FIG. 1), a torsion bar (resilient member) 13 inserted in the tubular input shaft 11 and connected at its upper end portion to the input shaft 11 by means of a pin 12, and an output shaft (pinion shaft) 15 connected by a pin 14 to a lower end portion of the torsion bar 13, the output shaft 15 having a lower portion on which the pinion 7 of the rack-and-pinion mechanism is formed.

The torsion bar 13 is a resilient member which is capable of producing a torsional angle or twist exactly proportional to the steering torque and which allows the input shaft 11 and the output shaft 15 to rotate relatively to each other to thereby create a relative torsional displacement therebetween. The rack 8a is toothed on a rack shaft 8 extending in a direction perpendicular to the sheet of FIG. 2. The rack 8 is held in mesh with the pinion 7. The input shaft 11, the torsion bar 13 and the output shaft 15 are concentric with each other.

The steering torque detector 3 is constructed to detect a steering torque in the steering system by detecting a relative torsional angle (relative torsional displacement or twist)

between the input shaft 11 and the output shaft 15. In the illustrated embodiment, the detector 3 comprises a potentiometer.

The torque transmitting mechanism 6 includes a toothed wheel 32. The wheel 32 is formed by a relatively thick hollow cylindrical member mounted directly and rotatably on an upper portion of the output shaft 15. The cylindrical member (wheel) 32 has on its outside surface a toothed gear portion 32a, and an annular or ring-like input member 32b disposed above the toothed gear portion 32. The cylindrical member (wheel) 32 is formed from a self-lubricating material, such as oil-impregnated sintered metal.

The mechanical clutch 40 is disposed inside the input member 32b and has a structure detailed below with reference to FIG. 6.

The electric power steering device 1 of the present invention further includes a housing 26 which houses or contains therein the torque transmitting mechanism 6, part of the input shaft, part of the torsion bar 13, the output shaft 15, and mechanical clutch 40. The housing has an opening 26a at its upper end, the opening 26a being closed by a lid 71. The lid 71 is attached by screws 72 (only one being shown) to an upper end flange 26b of the housing 26, with an O-ring 73 disposed between the lid 71 and the end flange 26b to provide a hermetic seal therebetween.

The lid 71 has an upwardly swelled, annular central portion 71a forming a bearing retainer in which a bearing 74 is retained for rotatably supporting an intermediate portion of the input shaft 11 within the housing 26. Though not shown, the bearing 74 has a water-tight structure including a seal attached to an upper side (or both sides) of the bearing 74. A typical example of such water-tight bearing is the so-called "slide contact rubber seal bearing" equipped with a rubber seal held in sliding contact with an inner race of the bearing.

A dust cover 74 made of rubber and having a generally inverted cup-like configuration is firmly fitted on an intermediate portion of the input shaft 11 so as to cover the bearing retainer portion 71a of the lid 71. The dust cover 74 has a pair of spaced annular seal lips 75a projecting from an inner peripheral surface of the cup-like dust cover 75 and held in sealing contact with an outer peripheral surface of the bearing retainer portion 71a. The seal lips 75a provide a hermetic seal between the dust cover 75 and the bearing retainer portion 71a of the lid 71.

Thus, the bearing portion provided at an upper end of the housing 26 for the input shaft 11 has a water-tight structure which is composed of a small number of component and hence is simple in construction, easy to assemble, and reliable in operation.

In FIG. 2, designated by 66 is a plain washer press-fitted with the output shaft 15. Numerals 76, 77 denote a pair of bearings mounted on the housing 26 for rotatably supporting the output shaft 15. Numeral 78 denotes a nut threaded over an externally threaded lower end portion (not designated) of the output shaft 15 to set the output shaft 15 in position relative to the bearing 77, and numeral 79 denotes an end cap or plug fitted or otherwise threaded in an opening 26c to close the same, the opening 26c being formed at a lower end of the housing 26.

Figure 3A:
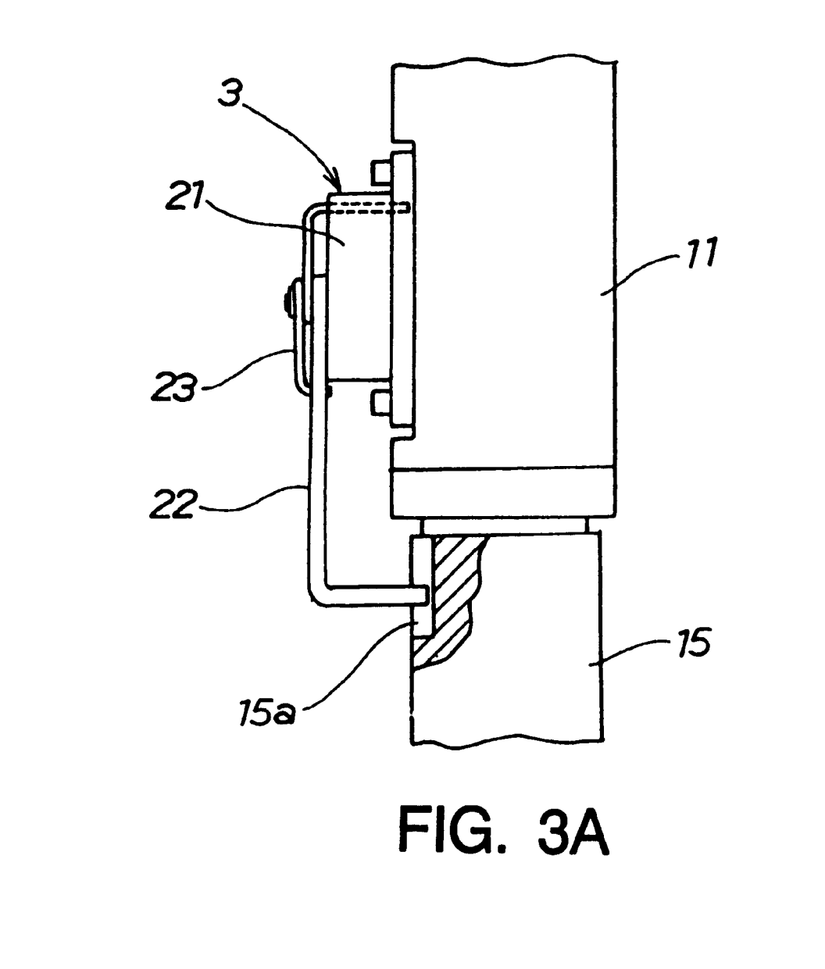
FIG. 3A is a schematic side view, with part shown in cross section, of a steering torque detecting means of the electric power steering device.
Figure 3B:
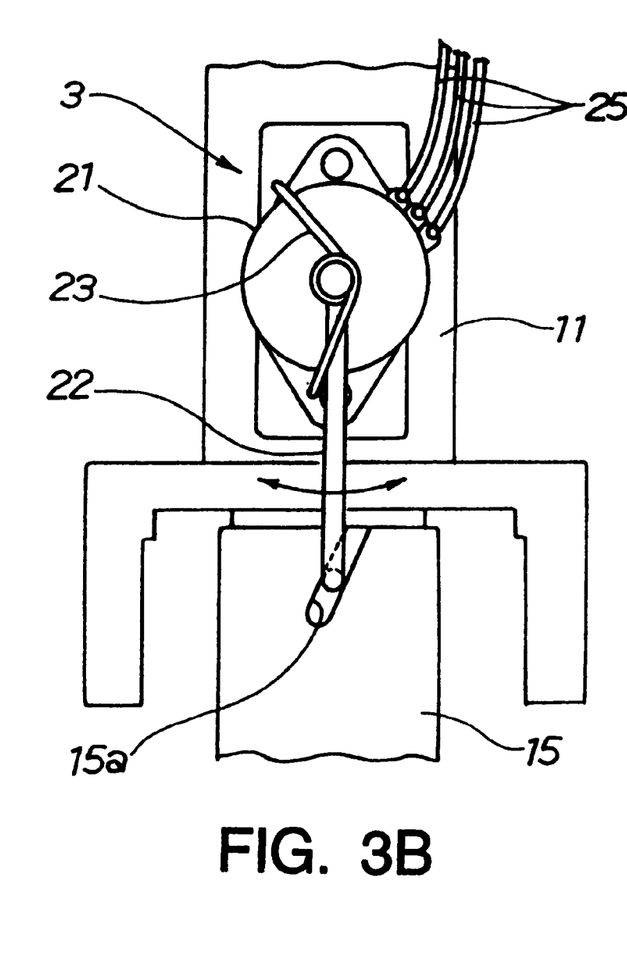
FIG. 3B is a front elevational view of FIG. 3A.

FIG. 3A is a side view showing the steering torque detector 3, and FIG. 3B is a front elevational view of FIG. 3A. The steering torque detector (potentiometer) 3 includes a detector body 21 containing within it a resistance element (not shown) and a sliding contact (not shown) slidable along the resistance element, and a lever-like actuator 22 pivotally movable to move or shift the sliding contact along the resistance element inside the detector body 21.

The detector body 21 is attached by screws (not designated) to an outer peripheral surface of a lower end portion of the input shaft 11. The lever-like actuator 22 has one end (fixed end) pivotally connected to the detector body 21 and an opposite end (free end) engaged in a diagonal groove 15a extending in an outer peripheral surface of an upper portion of the output shaft 15 at an angle to the axis of the output shaft 15. The diagonal groove 15a is skewed or inclined toward the right-hand direction in FIG. 3B. The steering torque detector 3 thus constructed can detect a relative torsional angle or twist (relative torsional displacement) between the input shaft 11 and the output shaft 15. The steering torque detector 3 further has a torsion spring 23 acting on the lever-like actuator 22 for urging the free end of the lever-like actuator 22 against one sidewall of the diagonal groove 15a, thereby eliminating a play or clearance between the diagonal groove 15a and the actuator 22 in a direction of pivotal movement of the actuator 22.

Referring back to FIG. 2, the input shaft 11 has a plurality (three in the illustrated embodiment) of electric cables 25 wound in plural turns (three turns, for example) around a cable reel 24. The electric cables 25 are connected at one end to the detector body 21 of the steering torque detector 3 and, at the other end, to a connector 27 attached to the housing 26.

Figure 4:
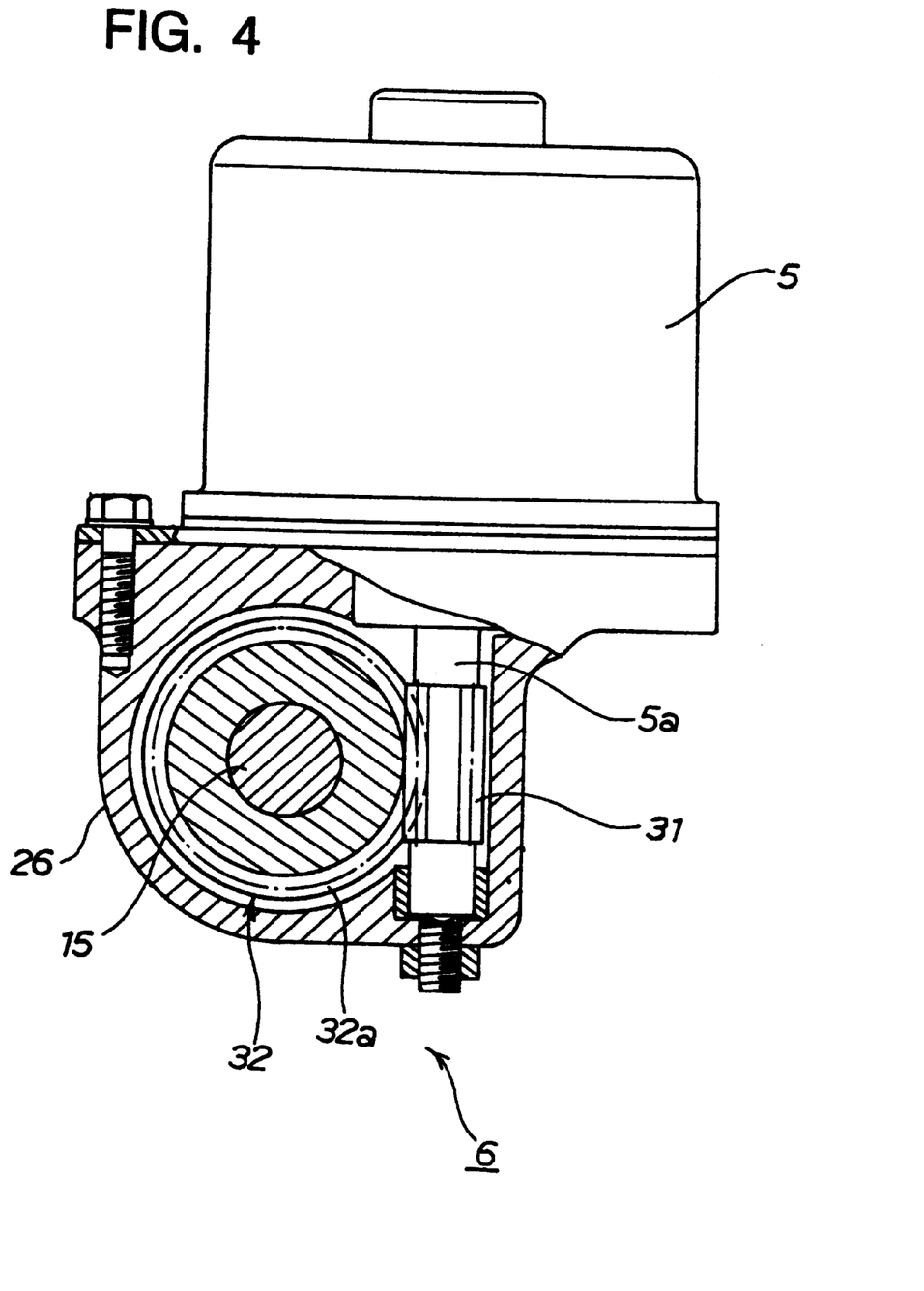
FIG. 4 is a cross-sectional view taken along line A—A of FIG. 2.

FIG. 4 is a cross-sectional view taken along line A—A of FIG. 2, showing a detailed cross section of the torque transmitting mechanism 6. The torque transmitting mechanism 6 comprises a worm gear mechanism including a worm 31 coupled to an output shaft 5a of the electric motor 5, and the wheel 32 rotatably mounted on the output shaft 15. The electric motor 5 is bolted to the housing 26.

By virtue of the torque transmitting mechanism 6, the rack 8 is driven via the pinion 9 by a combined torque which is equal in amount to the sum of the steering torque in the steering system (input shaft 11→torsion bar 13→output shaft 15) and the auxiliary torque from the electric motor 5.

Figure 5:
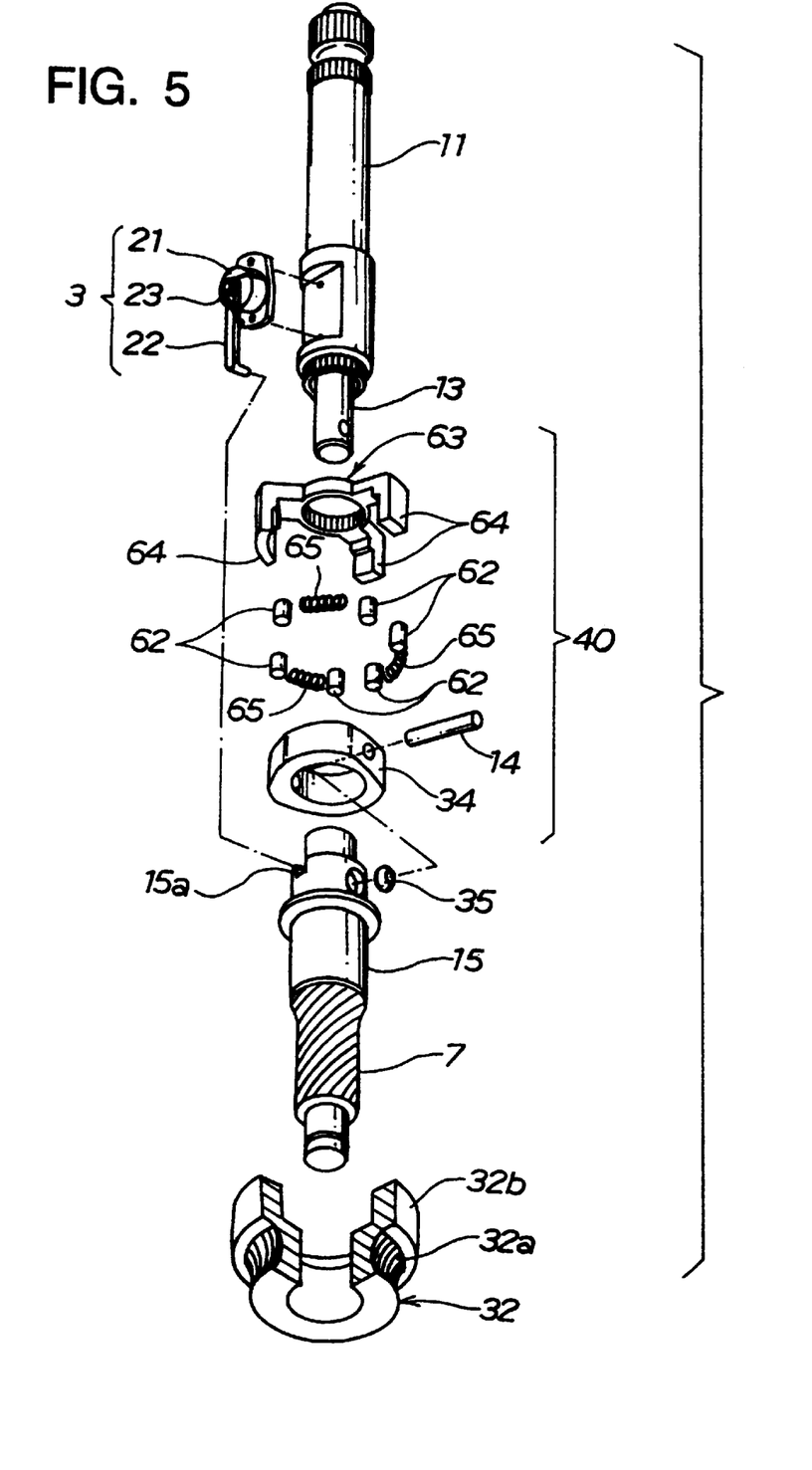
FIG. 5 is an exploded perspective view of a main portion of the electric power steering device.

FIG. 5 shows, in exploded perspective, a main portion of the electric power steering device. The mechanical clutch 40 includes, as one structural component, a generally annular position control means or controller 63 connected by serration to the lower end of the input shaft 11. The annular position controller 63 has downwardly projecting three leg-like position control members 64. The leg-like position control members 64 are angularly spaced from each other along the circumference of a circle. By virtue of the serration connection between the input shaft 11 and the position controller 63, the position controlling members 64 are connected to the steering wheel 2 shown in FIG. 1. The output shaft 15 is provided with an annular output member 34 at an upper end portion thereof.

Figure 6:
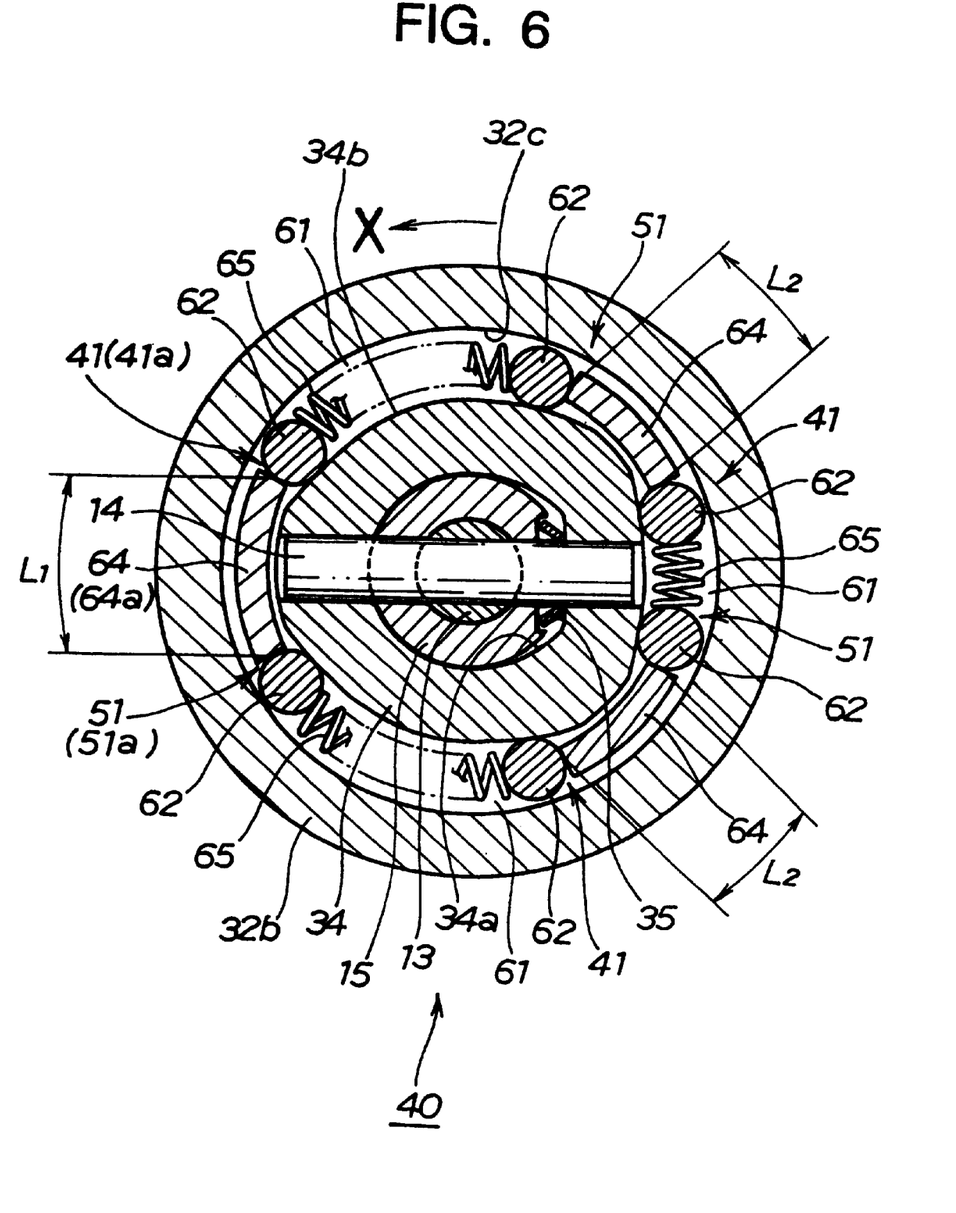
FIG. 6 is an enlarged cross-sectional view taken along line B—B of FIG. 2, showing a mechanical clutch incorporated in the electric power steering device.

FIG. 6 is a cross-sectional view taken along line B—B of FIG. 2 and shows a detailed cross section of the mechanical clutch 40, with the housing 26 being omitted for clarity.

As shown in FIG. 6, the mechanical clutch 40 comprises the so-called one-way clutch assembly and is constructed to transmit an auxiliary torque from the electric motor 5 to the steering system only when the acting direction of the auxiliary torque agrees with the steering direction of the steering system. More specifically, the mechanical clutch 40 is composed of two sets of three friction clutch mechanisms, each set being operative in response to rotation of the steering wheel 2 (and the position controlling members 64 connected thereto) in one particular direction.

In the illustrated embodiment, the three friction clutch mechanisms 41, 41, 41 in a first set cooperate to transmit the auxiliary torque in the counterclockwise direction indicated by the arrow X, while the three friction clutch mechanisms 51, 51, 51 cooperate to transmit the auxiliary torque in the counterclockwise direction which is opposite the direction of the arrow X. The first clutch mechanisms 41 and the second clutch mechanisms 51 are disposed alternately on the circumference of a circle.

The mechanical clutch 40, which is composed of two sets of three friction clutch mechanisms 41, 51 as described above, has six tapering spaces 61 arranged in succession along an annular space defined the input member 32b and the output member 34. The mechanical clutch 40 further includes six locking members 62 each received in a corresponding one of the tapering spaces 61 for selectively engaging and disengaging the input member 32b and the output member 34, the above-mentioned three position control members 64 disposed in the annular space between the input and output members 32b, 34 for positioning the locking members 62, and three urging members 37 in the form of compression coil springs disposed in the annular space for urging the respective locking members 62 toward the adjacent position control members 64.

The output member 34 has a generally isosceles triangular shape in cross section, having three sides curved outwardly and three corners truncated or rounded.

The tapering spaces 61 are defined between an inside surface 32c of the cylindrical input member 32b and an engagement surface (polygonal outside surface) 34b of the output member 34. Each of the tapering spaces 61 has a tapered or narrowed circumferential end. The position control members 64 are rotatable about an axis of the position controller 63 (i.e., the common axis of the input and output shafts 11, 15) and they are located on the circumference of the same circle at circumferential intervals.

The thus constructed mechanical clutch 40 operates to selectively engage and disengage the input member 32b and the output member 34 in response to angular movement or rotation of the position control members 64.

In each friction clutch mechanism set, a selected one of the clutch mechanisms 41, 51 (hereinafter referred to as "selected first clutch mechanism 41a" or "selected second clutch mechanism 51a") is so constructed as to shift the phase from the engaged state to the disengaged state in advance to the other two or remaining clutch mechanisms 41 or 51.

To this end, a particular one of the position control members 64 (hereinafter referred to as "selected position control member 64a") which is designated to position the locking member 61 of the selected first or second clutch mechanism 41a or 51a has a circumferential length $L_1$ which is larger than that $L_2$ of the other two or remaining position control members 64. The selected position control member 64a is normally aligned with one truncated corner or vertex of the generally isosceles triangular output member 34, the remaining position control members 64 being normally aligned with two other corners of the isosceles triangular output member 34 having the same angle.

The output member 34 is mounted on the output shaft 15 in such a manner that the output member 34 and the output shaft 15 are relatively movable in a diametrical direction. To this end, the output member 34 has a generally oblong or elliptical through-hole 34a, and the output shaft 15 of circular cross section is fitted in the oblong through-hole 34a. The pin 14, used for joining together the torsion bar 13 and the output shaft 15, extends diametrically across the output member 34 along a major axis of the oblong through-hole 34a. A resilient member comprised of a belleville washer 35 is loosely fitted around the pin 14 and acts between the output member 34 and the output shaft 15 to force an inner peripheral wall of the through-hole 34a against an outer peripheral surface of the output shaft 15.

More specifically, the resilient member 35 is disposed between the outer peripheral surface of the output shaft 15 and an inner peripheral wall portion of the through-hole 34a extending transversely across the major axis of the oblong through-hole 34a. The resilient member 35 can generate a resilient force acting in a direction parallel to the direction of movement of the output member 34 relative to the output shaft 15 (along the major axis of the oblong through-hole 34a). Thus, the output member 34 is forced against the output shaft 15. The output member 34 can be displaced toward a center of the width of the selected position control member 64a, in a manner described later on.

To enable the output member 34 to move in the diametrical direction when only one clutch mechanism of either set (i.e., the selected first clutch mechanism 41a or the selected second clutch mechanism 51a) is disengaged, the engagement surface 34b of the output member 34 is profiled such that a surface portion which is adapted for engagement with the locking member 62 of each of the remaining clutch mechanisms 41, 51 has a downslope. With the engagement surface 34b thus profiled, when the output member 34 moves in a diametrical direction in response to disengagement of the selected clutch mechanism 41a or 51a, the locking members 62 roll on the downslope surface portions smoothly and do not hinder movement of the output member 34. As a consequence of this movement of the output member 34, the tapering spaces 61 of the remaining clutch mechanisms 41, 51 are slightly spread or widened, and so the locking members 61 of the remaining clutch mechanisms 41, 51 can be disengaged with a smaller force. In other words, all the first or second clutch mechanisms 41, 51 can be disengaged by a force substantially equal to the force required to displace only one clutch mechanism (i.e., the selected first or second clutch mechanism 41a or 51a).

The operation of the mechanical clutch 40 will be described in further detail with reference to FIGS. 1 and 6 through 8.

When the steering wheel 2 (FIG. 1) is not actuated, the steering torque detector 3 generates no detection signal and, hence, the control unit 4 sends no assist command signal to the electric motor 5. The electric motor 5 is, therefore, kept in the stationary or inoperative condition. Thus, all the clutch mechanisms 41, 51 are in the disengaged state (neutral position), as shown in FIG. 6.

In cases where a steering torque on the steering wheel 2 is small and the electric motor 5 generates no auxiliary torque, the relative position or phase between the position control members 64 connected to the input shaft 11 (FIG. 2) and the output member 34 does not show any material change. Stated in other words, the position control members 64 are slightly turned in one direction (counterclockwise direction indicated by the arrow X shown in FIG. 6, for example). But the degree or extent of angular movement of the position control members 64 is still insufficient to engage the first clutch mechanisms 41. Thus, the output member 34 is free from the effect of a friction and an inertial force produced by the electric motor 5 and is turned or rotated by a steering torque in the steering system (input shaft 11→torsion bar 13→output shaft 15), thereby driving the output shaft 15.

Alternatively, when a steering torque on the steering wheel 2 is large and the electric motor 5 is generating an auxiliary torque, the phase between the position control members 64 and the output member 34 is changed greatly. In this instance, the position control members 64 (including the selected position control member 64a) are greatly displaced in one direction (counterclockwise direction indicated by the arrow X shown in FIG. 7, for example). With this angular displacement of the position control members 64, the locking members 62 of the first clutch mechanisms 41 are displaced by the force of the urging members 65 toward the narrowed circumferential ends of the associated tapering spaces 61 and then wedge between the input member 32b and the output member 34 to thereby connect them together. All the first clutch mechanisms 41 are thus brought to the engaged state.

Figure 7:
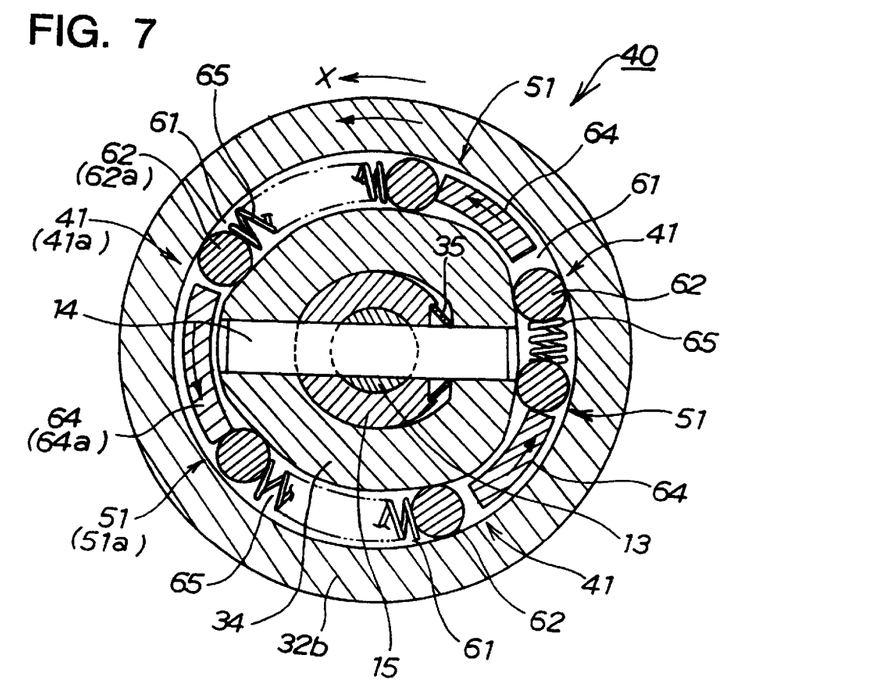
FIGS. 7 and 8 are cross-sectional views illustrative of the operation of the mechanical clutch.
Figure 8:
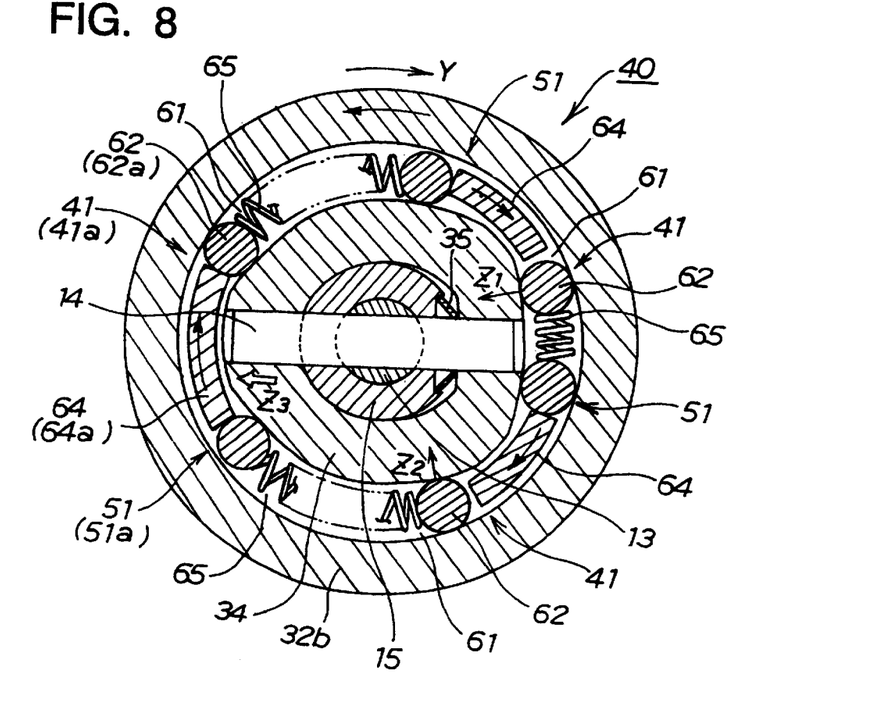

In this instance, since the electric motor 5 is rotating, the input member 32b is rotated in the direction of the arrow X. Thus, the auxiliary torque generated from electric motor 5 is transmitted from the input member 32b to the output member 34 via the first clutch mechanisms 41. The output member 34 is rotated in the direction of the arrow X to thereby drive the output shaft 15 by a combined torque which is equal to the sum of the steering torque in the steering system (input shaft 11→torsion bar 13→output shaft 15) and the auxiliary torque from the electric motor 5.

Thereafter, when the need arises due to some reasons, the first clutch mechanisms 41 are disengaged while transmission of the auxiliary torque from the electric motor 5 is still continuing. In this instance, the electric power steering device operates as follows.

The steering wheel 2 (FIG. 1) is steered or turned in the opposite direction whereupon the position control members 64 turn in a direction (indicated by the arrow Y in FIG. 9) which is opposite to the rotating direction of the input member 34b. During that time, the selected position control member 64a having a longer circumferential length than the other two position control members 64 comes into contact with the right-hand adjacent locking member (designated by 62a for expediency) before the other two or remaining position control members 64, 64 reach the associated locking members 62. The selected position control member 64a then forces the locking member 62a in the direction of the arrow Y against the force of the urging member 65 and a frictional force acting between the input member 32b and the output member 34.

With this displacement of the locking member 62a, the selected first clutch mechanism 41 is disengaged. In this instance, however, since the remaining position control members 64, 64 are still distant from the right-hand adjacent locking members 62, 62, the forces applied from the respective locking members 62 onto the output member 34 are ill-balanced. More particularly, the output member 34 is subjected to an unbalanced load or force (indicated by vector $Z_3$ shown in FIG. 8) resulting from two component forces (indicated by vectors $Z_1$, $Z_2$) applied from the two other or remaining locking members 62. By the effect of this unbalanced load, the output member 34 is slightly displaced toward the selected position control member 64a against the force of the resilient member 35 while it is guided by the pin 14. With this displacement of the output member 34, the tapering spaces 61 receiving therein the remaining locking members 62 are slightly spread or enlarged and, consequently, the wedging force applied from the remaining locking members 62 to the input and output members 32b, 34 is reduced.

Immediately thereafter, the remaining position control members 64, 64 come into contact with the remaining locking members 62, respectively, and then force them toward their original neutral position shown in FIG. 6. Thus, the other two or remaining first clutch mechanisms 41 are disengaged. In immediate response to this disengagement of the remaining clutch mechanisms 41, the output member 34 automatically returns to its original neutral position by the resilient force of the resilient member 35.

The second clutch mechanisms 51 operate in the same manner as, but in the opposite direction to, the first clutch mechanisms 41. Accordingly, in response to rotation of the steering wheel 2 (FIG. 1), the second clutch mechanisms 51 can be also selectively engaged and disengaged in like manner as described above with reference to FIGS. 6 to 8.

Figure 9A:
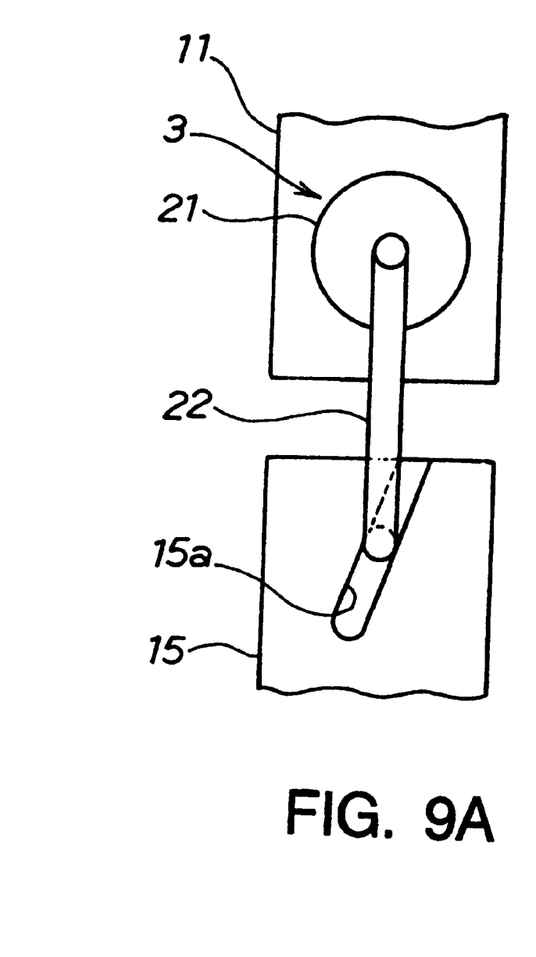
FIGS. 9A through 9C are diagrammatical views showing the principle for the adjustment of the neutral position of the steering torque detecting means.
Figure 9B:
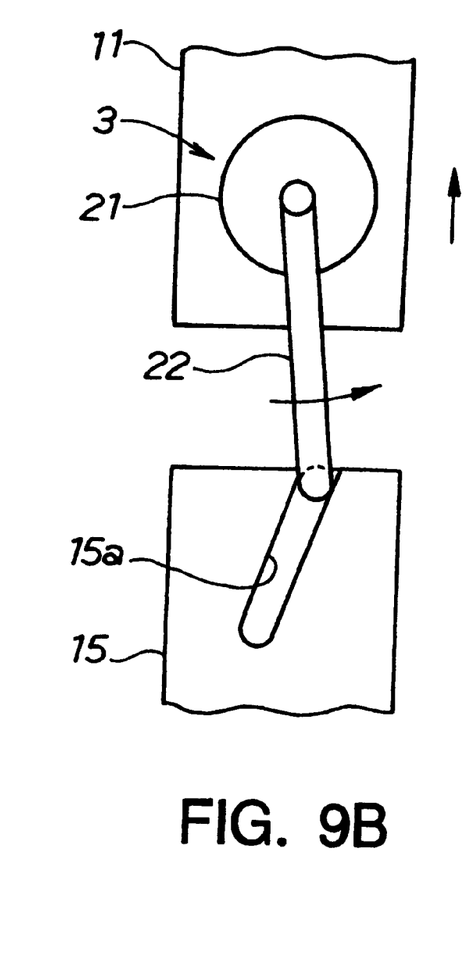
Figure 9C:
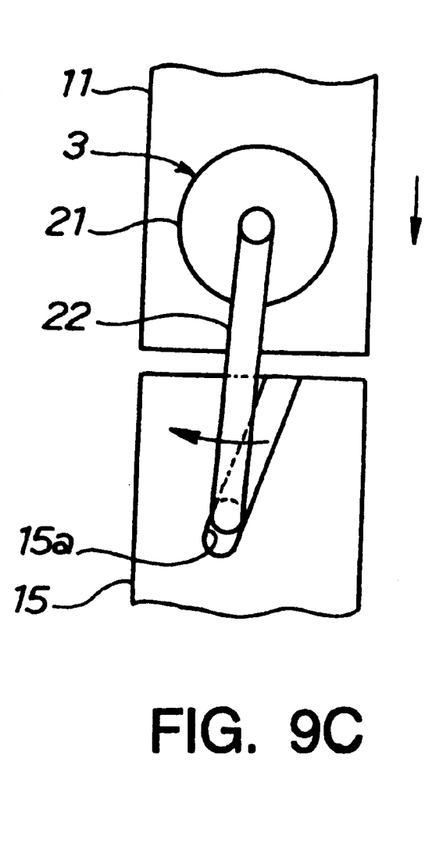

FIGS. 9A to 9C illustrate the principle of operation based on which a neutral position adjustment of the steering torque detector 3 is performed.

For purposes of illustration, the steering torque detector 3 having a detector body 21 attached to the input shaft 11 and a lever-like actuator 22 engaged at its free end with the diagonal groove 15a in the output shaft 15 is initially disposed in the position shown in FIG. 9A.

When the input shaft 11 is moved upwards, as shown in FIG. 9B, the lever-like actuator 22 turns in the counterclockwise direction about its distal end pivoted to the detector body 21 because the free end of the actuator 22 is guided to ascend the diagonal groove 15a inclined rightwards in FIG. 9A. Counterclockwise movement of the actuator 22 causes the sliding contact (not shown but contained within the detector body 21) to slide along the resistance element (also not shown but contained within the detector body 21) in one direction.

Conversely, when the input shaft 11 is lowered, as shown in FIG. 9C, the lever-like actuator 22 turns in the clockwise direction relative to the detector body 21 as the free end of the actuator 22 is guided to slide down the diagonal groove 15a. With this clockwise movement of the actuator 22, the sliding contact contained within the detector body 21 moves in the opposite direction along the resistance element.

Since the actuator 22, in response to the axial movement of the input shaft, turns to move the sliding contact along the resistance element (both contained within the detector body 21), it is possible to adjust the neutral position of the steering torque easily and accurately.

Referring now to FIGS. 10A–10D, there is shown the manner in which the neutral position of the steering torque detector 3 and the neutral position of the mechanical clutch 40 (friction clutch mechanisms) are adjusted.

Figures 10A, 10B, 10C:
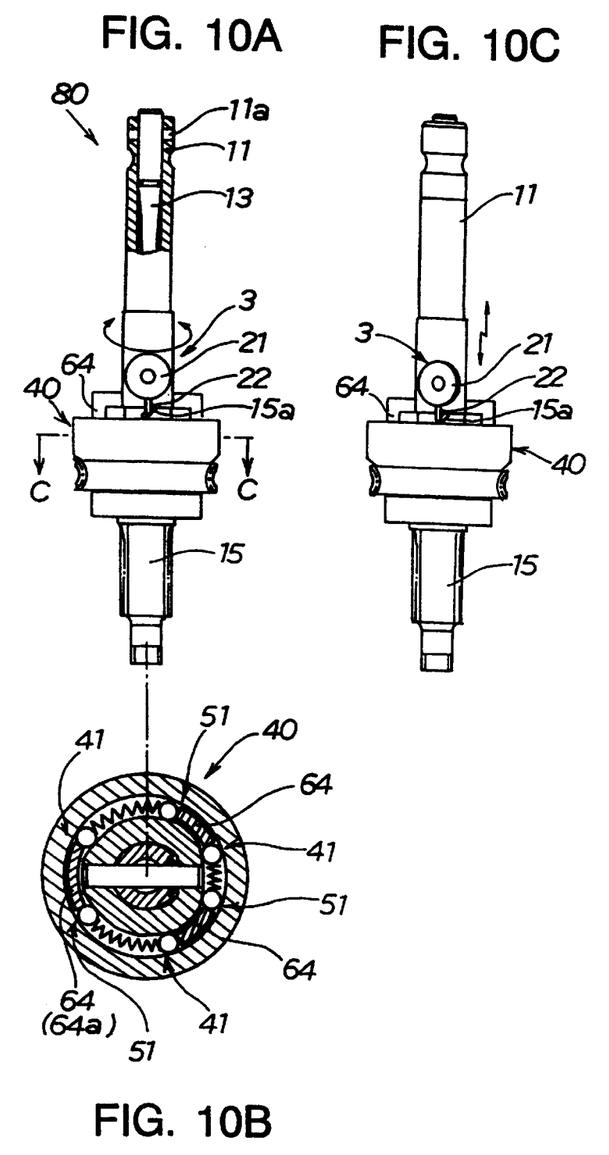
FIG. 10A is a schematic view, partly in cross section, showing the manner in which the neutral position of the mechanical clutch is adjusted.
FIG. 10B is a cross-sectional view taken along line C—C of FIG. 10A.
FIG. 10C is a schematic view illustrative of the manner in which the neutral position of the steering torque detecting means is adjusted.

(1) At first, as shown in FIG. 10A, the torsion bar 13 is inserted in the tubular input shaft 11. The input shaft has a pin receiving hole 11a at its upper end portion. Then, part of the torque transmitting mechanism 6, the input shaft 11, the torsion bar 13, the output shaft 15, and the mechanical clutch 40 are assembled together.

(2) Subsequently, the detector body 21 of the steering torque detector 3 is attached to an outer peripheral surface of the input shaft 11, and the lever-like actuator 22 of the steering torque detector 3 is engaged in the diagonal groove 15a in the outer peripheral surface of the output shaft 15. Thus, the input shaft 11, the output shaft 15, the torsion bar 13, the steering torque detector 3, the torque transmission mechanism 6, and the mechanical clutch 40 (clutch mechanisms) are assembled together to form a single semi-finished steering assembly 80.

(3) Thereafter, the input shaft 11, which is still kept rotatable relative to the torsion bar 3, is turned about its own axis until an exact neutral position of the mechanical clutch 40 is found or established. Stated in other words, the input shaft 11 is turned in a manner as indicated by the arrows shown in FIG. 10A so that the position control members 64 are placed in their neutral position, as shown in FIG. 10B. This position adjustment work or operation is very simple but is enough to perform the neutral position adjustment of the mechanical clutch 40 with improved accuracy.

(4) Then, as shown in FIG. 10C, the input shaft 11 is moved in the axial direction until an exact neutral position of the steering torque detector 3 is found or established. Stated in further detail, the input shaft 11 is moved up and down as indicated by the arrows shown in FIG. 10C so that the neutral position of the steering torque detector 3 is set in accordance with the principle described above with reference to FIGS. 9A–9C. This adjustment work is also simple but is enough to perform the neutral position adjustment of the steering torque detector 3 with improved accuracy.

Figure 10D:
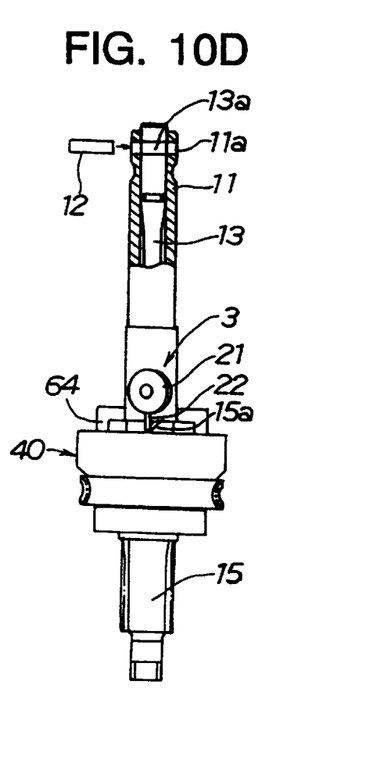
FIG. 10D is a schematic view, partly in cross section, showing the manner in which the respective neutral positions of the mechanical clutch and the steering torque detecting means are set or fixed.

(5) Finally, as shown in FIG. 10D, the torsion bar 13 is machined or otherwise drilled to form a pin receiving hole 11a in registry with the pin receiving hole 11a in the input shaft 11. Then, the pin 12 is press-fitted in the pin receiving holes 11a, 13a, thereby joining the input shaft 11 and the torsion bar 13.

As described above, the neutral position of the mechanical clutch 40 is adjusted first and then the adjustment of the neutral position of the steering torque detector 3 is performed. Thus, the neutral position of the mechanical clutch 40 and the neutral position of the steering torque detector 3 are adjusted separately and precisely.

Now, a method of the present invention for assembling an electric power steering device will be described below with reference to FIGS. 11A and 11B.

Figures 11A, 11B:
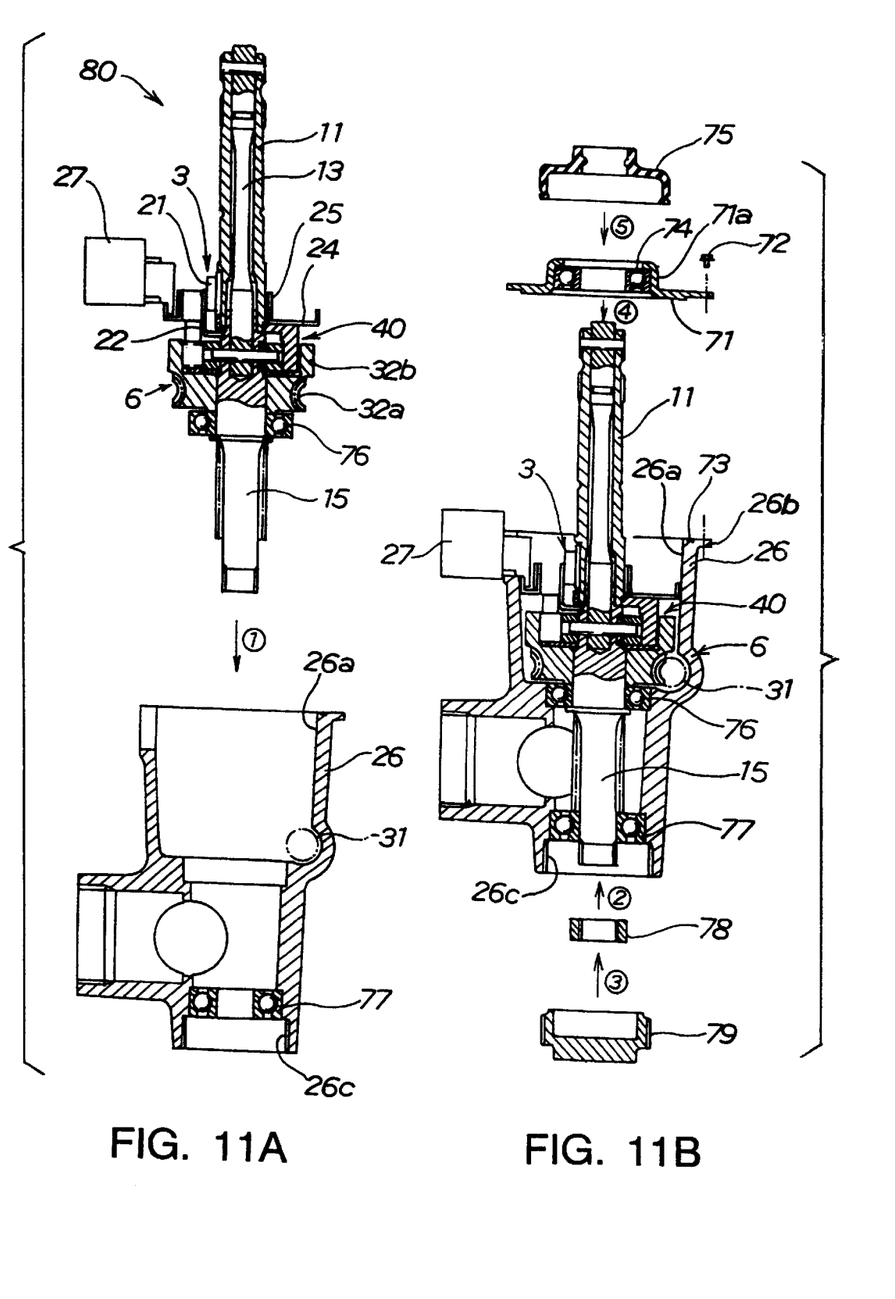
FIGS. 11A and 11B are exploded longitudinal cross-sectional views showing a sequence of operations performed to assemble an electric power steering device according to a method of the present invention.

(1) At first, as shown in FIG. 11, electric cables 25 and a connector 27 are attached to a semi-finished steering assembly 80 (identical to one shown in FIG. 10A). A bearing 77 is mounted on a lower end portion of the housing 26. Then, the semi-finished steering assembly 80 is inserted into the housing 26 through an opening 26a at an upper end of the housing 26 (as indicated by the arrow 1 in circle) such that part of the input shaft 11, the output shaft 15, the steering torque detector 3, the torque transmission mechanism 6 and the mechanical clutch 40 (clutch mechanisms) are received in the housing 26.

(2) Subsequently, as shown in FIG. 11B, a nut 78 is inserted into an opening 26c formed at the lower end of the housing 26 and then threaded over an externally threaded lower end portion of the output shaft 15 to thereby set or fasten the output shaft 15 with respect to the bearing 77 (as indicated by the arrow 2 in circle). In this condition, the output shaft 15 is rotatably mounted on the housing 27 by means of two bearings 77, 75, the bearing 75 being mounted in advance on the semi-finished steering assembly 80. Then, the opening 26c at the lower end of the housing 26 is closed by an end cap 79 (as indicated by the arrow 3 in circle).

(3) Thereafter, a lid 71 with a bearing 74 mounted thereon is fitted on the input shaft 11 (as indicated by the arrow 4 in circle). The lid 71 is then secured by screws 72 (only one being shown) to the upper end of the housing 26 to thereby close the opening 26a.

(4) Finally, a dust cover 75 is fitted on the input shaft 11 (as indicated by the arrow 5 in circle) such that a bearing retainer portion 71a of the lid 71a is covered by the dust cover 75.

The worm 31 of the torque transmitting mechanism 6 may be assembled in the housing 26 either before or after the semi-finished steering assembly 80 is inserted in the housing 26.

Thus, by inserting the semi-finished steering assembly 80 into the housing 26 through the opening 26a, the torque transmitting mechanism 6 and the mechanical clutch 40 (first and second friction clutch mechanisms 41, 51) are automatically and simultaneously received in the housing 26.

One preferred structural embodiment of the present invention has been described and disclosed. It is to be noted however that various changes and modifications of the present invention are possible in the light of the above teaching.

For instance, the resilient member 13 should by no means be limited to the torsion bar shown in the illustrated embodiments but may include any other resilient member on condition that the member is able to create a relative torsional displacement between the input shaft 11 and the output shaft 15 which is proportional in amount to the steering torque.

The diagonal groove 15a may be formed in an outer peripheral surface of the input shaft 11 for receiving and guiding the free end of the lever-like actuator 22 of the steering torque detector 3. In this instance, the detector body 21 is attached to an outer peripheral surface of the output shaft 15.

The number of the first clutch mechanisms 41 or the second clutch mechanisms 51 should by no means be limited to three in the illustrated embodiments but may be determined in option.

The output member 34 should be displaceable in the diametrical direction when it is forced by the remaining locking elements 62 upon disengagement of the selected locking element 62a. However, there is no limitation about the direction of displacement of the output member 34 relative to a peripheral element. This is because a frictional engagement force acting between the remaining locking members 62 and the output member 34 can be reduced automatically when the output member 34 is displaced in the diametrical direction by the force exerted by the same locking members 62.

The guide member used in combination with the output member 34 for guiding the latter is not limited to the pin 14 shown in the illustrated embodiments. Similarly, the resilient member used for urging the output member 34 against the output shaft 15 should by no means be limited to the belleville spring 35 but may be a compression spring (compression coil spring).

The tapering spaces 61 should preferably be defined between the inside surface 32c of the inside member 32 and the outside surface 34b of the output member 34. The shape of the outside surface (engagement surface) 34b of the output member 34 is not limited to one shown in FIG. 6. The input member 32b may have a polygonal inside surface in which instance the output member 34 preferably has a cylindrical outside surface.

The locking members 62 may be spherical other than cylindrical provided that they are selectively engageable and disengageable with the tapered or narrowed circumferential ends of the mating tapering spaces 61 to engage and disengage the input member 32b and the output member 34.

The urging members incorporated in the mechanical clutch 40 should by no means be limited to the compression springs (compression coil springs) 65 but may include a rigid rubber member or a plate spring.

The first and second clutch mechanisms 41, 51 should preferably be composed of a frictional engagement clutch and hence may include a known sprag clutch described below.

The sprag clutch includes a hollow cylindrical outer member or race (corresponding to the input member 32b) having a cylindrical inside engagement surface, a hollow cylindrical inner member or race (corresponding to the outside member 34) disposed concentrically with the outer race and having a cylindrical outside engagement surface, a plurality of sprags (cams having a wedging action) placed between the inner and outer races, a member (corresponding to the position control members 64) connected with the steering handle and positioning the sprags, and springs urging the respective sprags in a direction to wedge them between the inside and outside engagement surfaces (see the clutch device shown in Japanese Patent Laid-open Publication No. HEI 1-188727).

The neutral position of the electric power steering device may be adjusted in such a manner as described below: At first, the input shaft 11 or the output shaft 15 which is kept rotatable relative to the resilient member 13 is turned until the neutral position of the mechanical clutch is obtained. Then, the input shaft 11 or the output shaft 15 is displaced in the axial direction until the neutral position of the steering torque detector 3 is obtained. Thereafter, the input shaft 11 or the output shaft 15 is fixed to the resilient member 13.

The electric power steering device of the present invention and the method of assembling the same offer various advantages described below.

Since a detector body of a steering torque detector is directly attached to one of the input shaft and the output shaft, and an actuator of the steering torque detector is engaged with the other shaft, an adjustment of the neutral position of steering torque detector can be performed after the input shaft, the output shaft, the steering torque detector, and a torque transmitting mechanism are assembled together to form a single semi-finished steering assembly, and before the semi-finished steering assembly is received in a housing. More particularly, since the neutral position adjustment is effected in such a condition that the steering torque detector is already assembled with the semi-finished steering assembly but the semi-finished steering assembly is still standing alone before it is assembled in the housing, the neutral position of the steering torque detector can be obtained with excellent accuracy but through a simple adjustment work or operation.

In addition, since the detector body and the actuator of the steering torque detector are received at one time in the housing automatically when the semi-finished steering assembly is set or installed in the housing, the efficiency of the assembling operation (of the detector and of the power steering device) is extremely high. The steering torque detecting means of the foregoing construction is easy to replace.

Furthermore, since a clutch mechanism is disposed between the torque transmitting mechanism and the pinion shaft (output shaft) and is received in the housing together with the torque transmitting mechanism and the pinion shaft, since the pinion shaft is rotatably mounted only on the housing, and since a wheel interconnecting the clutch mechanism and the torque transmitting mechanism is rotatably mounted only on the pinion shaft, it is possible to perform an adjustment of the neutral position of the clutch mechanism after the pinion shaft, the torque transmitting mechanism, and the clutch mechanism are assembled together to form a semi-finished steering assembly and before the semi-finished steering assembly is set or installed in the housing. More particularly, since the neutral position adjustment is effected in such a condition that the clutch mechanism is already assembled with the semi-finished steering assembly but the semi-finished steering assembly is still standing alone before it is assembled in the housing, the neutral position of the clutch mechanism can be obtained with high accuracy but through a simple adjustment work.

In addition, since the clutch mechanism is automatically received when the semi-finished steering assembly is set in the housing, assembling efficiency of the electric power steering device increases greatly. Furthermore, since the pinion shaft is rotatably mounted only on the housing, and since the wheel of the torque transmitting mechanism is rotatably mounted only on the pinion shaft, it is possible to fit the pinion shaft directly with the housing. By virtue of this supporting structure, the assembling accuracy of the electric power steering device is greatly improved.

In one preferred form, the steering torque detector is composed of a detector body directly attached to one of the input shaft and the output shaft, and an actuator engaged with the other of the input shaft and the output shaft for activating the detector body. The clutch mechanism is disposed between the torque transmitting mechanism and the output shaft. The torque transmitting mechanism includes a wheel for connecting together the torque transmitting means and the clutch mechanism, the wheel being rotatably supported solely on the output shaft. And, the steering torque detecting means and the clutch mechanism are received in the housing together with the input shaft and the output shaft. With this construction, an adjustment of the neutral position of the clutch mechanism and an adjustment of the neutral position of the steering torque detector can be performed after the input shaft, the output shaft, the steering torque detector, the torque transmitting mechanism, and the clutch mechanism are assembled together to form a single semi-finished steering assembly, and before the semi-finished steering assembly is received in the housing. More particularly, since both adjustments are effected in such a condition that the clutch mechanism and the steering torque detector are already assembled with the semi-finished steering assembly but the semi-finished steering assembly is still standing alone before it is assembled into the housing, the neutral position of the clutch mechanism and the steering torque detector can be obtained with excellent accuracy but through a simple adjustment work.

In addition, since the clutch mechanism and the steering torque detector are received at one time in the housing automatically when the semi-finished steering assembly is set or installed in the housing, the electric power steering device can be assembled with improved efficiency. Furthermore, replacement of the steering torque detector is easy to perform. Since the output shaft is rotatably mounted only on the housing, and since the wheel of the torque transmitting mechanism is rotatably mounted only on the output shaft, the output shaft can be directly fitted with the housing. By virtue of this supporting structure, the assembling accuracy of the electric power steering device is greatly improved.

The electric power steering device assembling method of the present invention is characterized by the steps of: assembling together an input shaft adapted to be connected to a steering wheel, an output shaft adapted to be connected to steered wheels, a resilient member for connecting together the input shaft and the output shaft while allowing them to rotate relatively to each other, a steering torque detecting means for detecting relative rotation between the input shaft and the output shaft, a torque transmitting means for transmitting an auxiliary torque generated by an electric motor to the output shaft, and a clutch mechanism thereby to form a semi-finished steering assembly; then, inserting the semi-finished steering assembly into a housing through an opening at one end of the housing such that part of the input shaft, the output shaft, the steering torque detecting means, the torque transmitting means, and the clutch mechanism are all received at one time in the housing; and thereafter, attaching a lid to the one end of the housing to close the opening. The method may further include, between the assembling step and the inserting step, a step of adjusting the neutral position of the clutch mechanism, and a step of adjusting the neutral position of the steering torque detecting means. The step of adjusting the neutral position of the steering torque detecting means and the step of adjusting the neutral position of the clutch mechanism are performed separately from each other. Since both adjustment processes are effected in such a condition that the clutch mechanism and the steering torque detecting means are already assembled with the semi-finished steering assembly but the semi-finished steering assembly is still standing alone before it is assembled in the housing, the neutral position can be obtained with excellent accuracy but through a simple adjustment work.

In addition, since the clutch mechanism and the steering torque detector are received in the housing automatically when the semi-finished steering assembly is set or installed in the housing, the electric power steering device can be assembled with improved efficiency.

Obviously, various minor changes and modifications of the present invention are possible in the light of the above teaching. It is therefore to be understood that within the scope of the appended claims the invention may be practiced otherwise than as specifically described.

What is claimed is:

1. A method of assembling an electric power steering device, comprising the steps of:

assembling together an input shaft adapted to be connected to a steering wheel, an output shaft adapted to be connected to steered wheels, a resilient member for connecting together said input shaft and said output shaft while allowing them to rotate relatively to each other, a steering torque detecting means for detecting relative rotation between said input shaft and said output shaft, a torque transmitting means for transmitting an auxiliary torque generated by an electric motor to said output shaft, and a clutch mechanism thereby to form a semi-finished steering assembly;

then, inserting said semi-finished steering assembly into a housing through an opening at one end of said housing such that part of said input shaft, said output shaft, said steering torque detecting means, said torque transmitting means, and said clutch mechanism are all received at one time in said housing; and thereafter, attaching a lid to said one end of said housing to close said opening.

2. A method according to claim 1, between said assembling step and said inserting step, further including a step of adjusting the neutral position of the clutch mechanism.

3. A method according to claim 1, between said assembling step and said inserting step, further including a step of adjusting the neutral position of the steering torque detecting means.

4. A method according to claim 2, between said assembling step and said inserting step, further including a step of adjusting the neutral position of the steering torque detecting means, wherein said step of adjusting the neutral position of the steering torque detecting means and said step of adjusting the neutral position of the clutch mechanism are performed separately from each other.

* * * * *